United States Patent
Oettle

(10) Patent No.: US 8,317,434 B2
(45) Date of Patent: Nov. 27, 2012

(54) TOOL SYSTEM FOR MACHINING

(75) Inventor: Matthias Oettle, Riederich (DE)

(73) Assignee: Hartmetall-Werkzeugfabrik Paul Horn GmbH, Tubingen (DE)

( * ) Notice: Subject to any disclaimer, the term of this patent is extended or adjusted under 35 U.S.C. 154(b) by 344 days.

(21) Appl. No.: 12/159,825

(22) PCT Filed: Jul. 12, 2006

(86) PCT No.: PCT/EP2006/006806
§ 371 (c)(1),
(2), (4) Date: Jul. 1, 2008

(87) PCT Pub. No.: WO2007/087835
PCT Pub. Date: Aug. 9, 2007

(65) Prior Publication Data
US 2008/0298922 A1 Dec. 4, 2008

(30) Foreign Application Priority Data
Jan. 13, 2006 (DE) .......... 10 2006 001 747

(51) Int. Cl.
*B23D 1/14* (2006.01)
*B23D 61/06* (2006.01)

(52) U.S. Cl. .......... 407/110; 407/109; 83/845

(58) Field of Classification Search .......... 407/30, 407/34, 40, 107, 110, 109, 106, 50, 90, 103, 407/117; 83/842, 845
See application file for complete search history.

(56) References Cited

U.S. PATENT DOCUMENTS

| 80,929 A * | 8/1868 | Disston .......... 83/845 |
| 108,059 A * | 10/1870 | Smith .......... 83/839 |
| 289,715 A * | 12/1883 | Risdon .......... 83/845 |
| 4,443,136 A * | 4/1984 | Kemmer .......... 407/72 |
| 5,092,212 A | 3/1992 | Pawlosky |
| 6,116,823 A * | 9/2000 | Mihic .......... 407/40 |
| 6,565,292 B2 * | 5/2003 | Hecht .......... 407/110 |
| 6,695,549 B2 * | 2/2004 | Hecht .......... 407/40 |
| 6,971,823 B2 * | 12/2005 | Satran et al. .......... 407/46 |
| 7,163,361 B2 * | 1/2007 | Hecht .......... 407/109 |
| 7,407,347 B2 * | 8/2008 | Virtanen et al. .......... 407/110 |
| 2005/0238444 A1 | 10/2005 | Virtanen et al. |

FOREIGN PATENT DOCUMENTS

AT  006 940 U1  8/2003

(Continued)

OTHER PUBLICATIONS

Japanese Office Action for JP2008-549771, Aug. 23, 2011, 6 pages.

*Primary Examiner* — Kenneth E. Peterson
*Assistant Examiner* — Jennifer Swinney
(74) *Attorney, Agent, or Firm* — Bracewell & Giuliani LLP

(57) ABSTRACT

In a tool system for machining, having at least one receptacle for a cutting insert which can be brought at least partly with a bearing surface of convex curvature into contact with a supporting surface of concave curvature on the receptacle, the convexity and concavity of bearing surface and supporting surface, respectively, which face one another, define lines of curvature which are different from one another and of which at least one deviates from the circular form.

13 Claims, 4 Drawing Sheets

FOREIGN PATENT DOCUMENTS

| | | | |
|---|---|---|---|
| AT | 006940 U1 * | 8/2003 |
| AT | 006940 U1 * | 6/2004 |
| DE | 19939323 A1 * | 3/2000 |
| DE | 10042402 A1 * | 5/2001 |
| EP | 0 417 862 A1 | 3/1991 |
| EP | 1 591 179 A2 | 2/2005 |
| GB | 2 064 390 A | 6/1981 |
| JP | 2003506221 A | 2/2003 |
| WO | WO 9308945 A1 * | 5/1993 |
| WO | WO01/10585 A1 | 2/2001 |

* cited by examiner

TOOL SYSTEM FOR MACHINING

CROSSREFERENCES TO RELATED APPLICATIONS

This application is a national stage entry of PCT/EP2006/006806, filed on Jul. 7, 2006 designating the U.S., which international patent application has been published in German language as WO 2007/087835 A1 and claims priority from German patent application 10 2006 001 747.1, filed on Jan. 13, 2006. The entire contents of these priority applications are incorporated herein by reference.

BACKGROUND OF THE INVENTION

The invention relates to a tool system for machining, having at least one receptacle for a cutting insert which can be brought at least partly with a bearing surface of convex curvature into contact with a supporting surface of concave curvature on the receptacle.

RELATED PRIOR ART

Tool systems of this type are known, cf. EP 1 591 179 A2. In such systems, the cutting insert, preferably in the form of a cutting tip, is formed with a cutting edge, projecting at a distance from the bearing surface, in such a way that it can be inserted in the receptacle. If the cutting insert is rotated after insertion in the receptacle, such that its bearing surface moves along the supporting surface on the receptacle, the cutting insert is fixed on account of eccentricity of the curvatures of the interacting surfaces.

SUMMARY OF THE INVENTION

With regard to operational reliability and the highest accuracy during the machining operations, satisfactory fixing of the cutting insert in position in the receptacle is of prime importance. The object of the invention is therefore to provide a tool system for machining which meets the requirements with regard to the fixing of the cutting insert in position to an especially high degree.

According to an aspect of the invention, this object is achieved by a tool system for machining having:
a cutting insert and
at least one receptacle for the cutting insert which can be brought at least partly with a bearing surface of convex curvature into contact with a supporting surface of concave curvature on the receptacle,
wherein the convexity and concavity of bearing surface and supporting surface, respectively, which face one another, define lines of curvature which are different from one another and of which at least one deviates from the circular form, and wherein the course of the line of curvature of the bearing surface mostly corresponds to a helix having a pitch intensifying the convexity and/or in that the course of the line of curvature of the supporting surface mostly corresponds to a helix having a pitch intensifying the concavity, so that during rotation of the cutting insert an increasing clamping force up to a maximum upon reaching the end position of the cutting insert is produced.

The fact that according to this aspect the bearing surface of the cutting insert and the supporting surface on the receptacle define lines of curvature which are different from one another and of which at least one deviates from the circular form with regard to the type of curvature opens up the possibility, on account of the rotary movement of the cutting insert, of realizing a desired increase of the resulting clamping force as a function of the increase in the angle of rotation.

Compared with the abovementioned prior art, where a respective circular curvature course is provided for both the bearing surface and the supporting surface, the invention enables the cutting insert to be easily inserted into the receptacle in a freely accessible manner in the initial rotary position and achieves the effect that, during subsequent rotation, an increasing clamping force up to a maximum upon reaching the end position of the cutting insert is produced.

In a preferred embodiment the cutting insert provided is a cutting tip having a bearing surface which follows, at least in a certain region, a line of curvature corresponding to an arc of a circle, the helical course of the line of curvature is provided on the supporting surface of the receptacle. The pitch is in this case oriented in such a way that, on the supporting surface, the curvature of the concavity increases in the direction of rotation of the cutting tip.

In advantageous exemplary embodiments, the supporting surface, at one end of the receptacle, has an end section which follows a rectilinear course and is intended for contact with a counterholding surface which is provided on the cutting tip for supporting against cutting forces acting during operation.

This end section not only absorbs the cutting forces produced at the cutting edge of the cutting tip during operation but also forms, in interaction with the counterholding surface of the cutting tip, a first stop for fixing the rotary end position of the cutting tip. At the same time, the helical course of the supporting surface adjoins the inner end of the straight end section, this course extending up to the end of the supporting surface.

In this case, the arrangement may be made in such a way that following the end of the helical course of the supporting surface, there is a stop surface on the receptacle, said stop surface projecting toward the interior of the helix and forming a support for a further counterholding surface which is provided on the cutting tip for supporting against cutting forces and forms a further stop which defines the rotary end position of the cutting tip.

In especially advantageous exemplary embodiments, the receptacle is designed like a pocket in a parent body in which a slot opening is cut out, and this slot opening cuts free an elastically flexible clamping part in the parent body, which clamping part surrounds a large part of the helical course of the supporting surface and ends in front of the stop surface. Whereas frictional clamping of the cutting tip is therefore effected in the corresponding region of the helical course, wherein the clamping force depends on the elasticity properties, i.e. on the material cross section cut free, of the clamping part, the stop surface, which is offset from the clamping part cut free, forms a positive-locking stop for the associated counterholding surface of the cutting tip.

In order to ensure that the cutting tip is also satisfactorily fixed against transverse forces acting transversely to the cutting force, the supporting surface may have a V-shaped recess for laterally fixing a cutting tip which is provided with a bearing surface projecting in an inverted V shape.

The tool system according to the invention is especially suitable for use in rotary tools, in particular milling tools, wherein the parent body may be a disc rotatable about a tool axis and having a plurality of receptacles, distributed over its periphery, for cutting tips.

According to another aspect of the invention, a cutting insert for a tool system for machining is provided, having at least one receptacle for a cutting insert which can be brought at least partly with a bearing surface of convex curvature into contact with a supporting surface of concave curvature on the receptacle, wherein the convexity and concavity of bearing surface and supporting surface, respectively, which face one another, define lines of curvature which are different from one another and of which at least one deviates from the circular form, and wherein the course of the line of curvature of the bearing surface mostly corresponds to a helix having a pitch intensifying the convexity.

According to another aspect of the invention, tool system parent body for a tool system for machining, having at least one receptacle for a cutting insert which can be brought at least partly with a bearing surface of convex curvature into contact with a supporting surface of concave curvature on the receptacle, wherein the convexity and concavity of bearing surface and supporting surface, respectively, which face one another, define lines of curvature which are different from one another and of which at least one deviates from the circular form, and wherein the course of the line of curvature of the supporting surface mostly corresponds to a helix having a pitch intensifying the concavity.

BRIEF DESCRIPTION OF THE DRAWINGS

The invention is explained in more detail below with reference to an exemplary embodiment shown in the drawing, in which.

DESCRIPTION OF PREFERRED EMBODIMENTS

Figure 1:
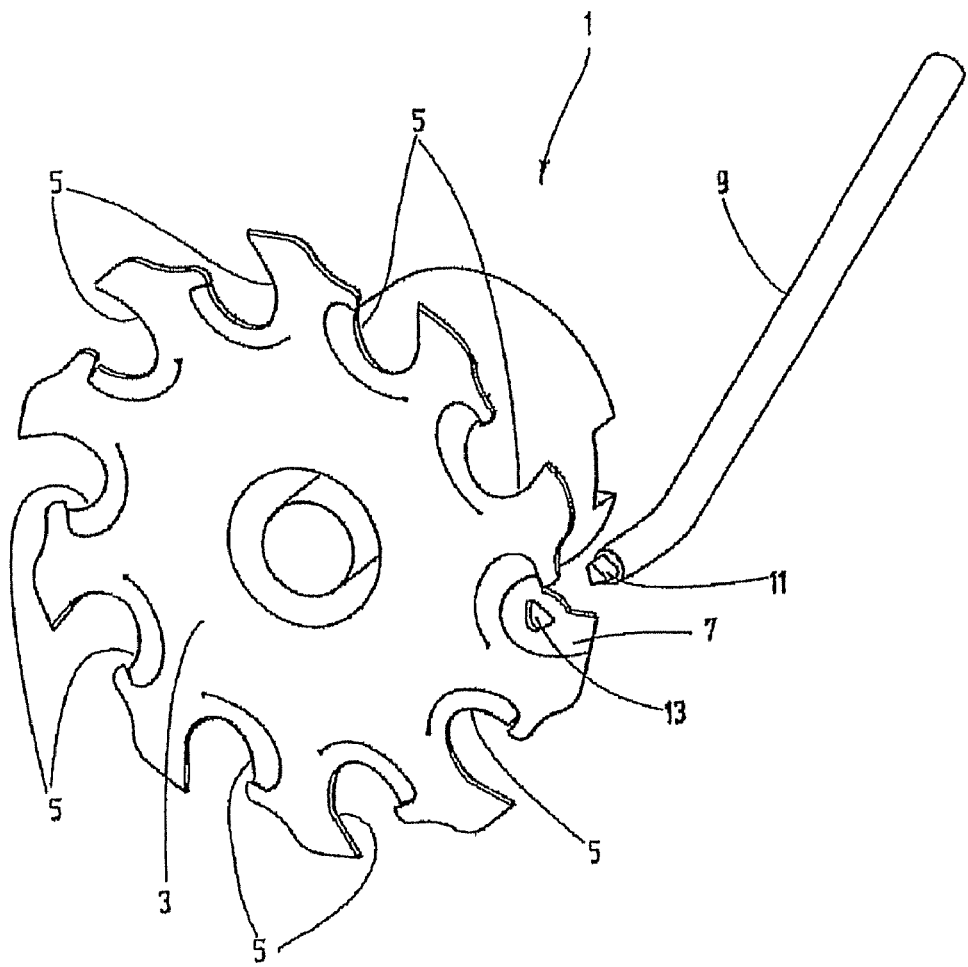
FIG. 1 shows a perspective oblique view of an exemplary embodiment of the tool system according to the invention in the form of a milling cutter, wherein, of the plurality of cutting inserts to be accommodated on the parent body, only a single cutting tip is shown.

The invention is shown below taking a milling cutter as an example, which is designated overall by 1 in FIG. 1 and has a disc-like parent body 3, which can be rotated mechanically in a known manner and has, distributed over its periphery, a number of pocket-like receptacles 5 for cutting inserts in the form of cutting tips 7. As can be seen from FIG. 1 and from FIGS. 3 and 4, the cutting tips 7 are in the form of a disc whose thickness measured between its flat side walls corresponds to the thickness of the parent body 3. In a conventional manner, the cutting tips 7 can be fixed in the relevant receptacle 5 by a rotary movement and can be released by a rotary movement in the opposite direction. FIG. 1 shows, as an auxiliary tool for rotating the cutting tips 7, a polygonal wrench 9 having a polygonal driver 11 for the engagement in a corresponding polygonal opening 13 in the cutting tip 7.

Figure 2:
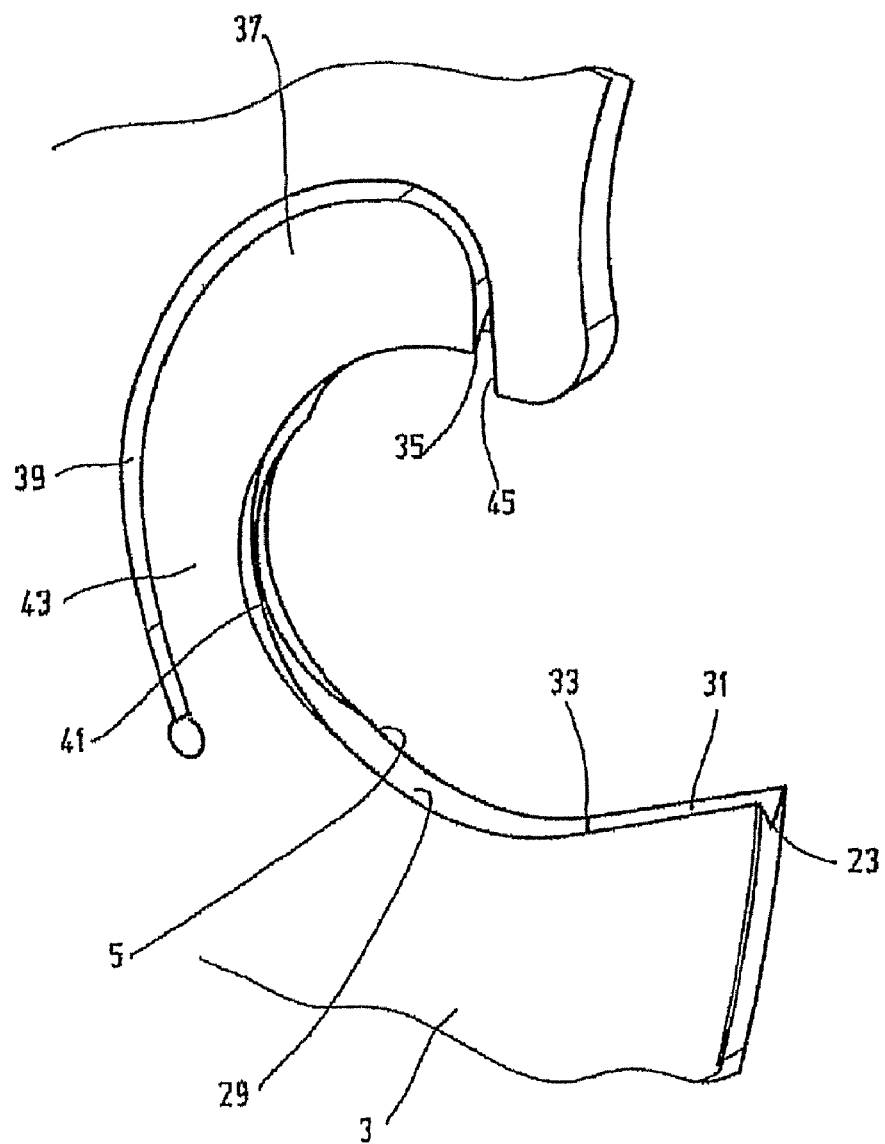
FIG. 2 shows a truncated and perspective view, on a much larger scale compared with FIG. 1, of only the region of a cutting tip receptacle of the parent body of FIG. 1 without inserted cutting tip.
Figure 3:
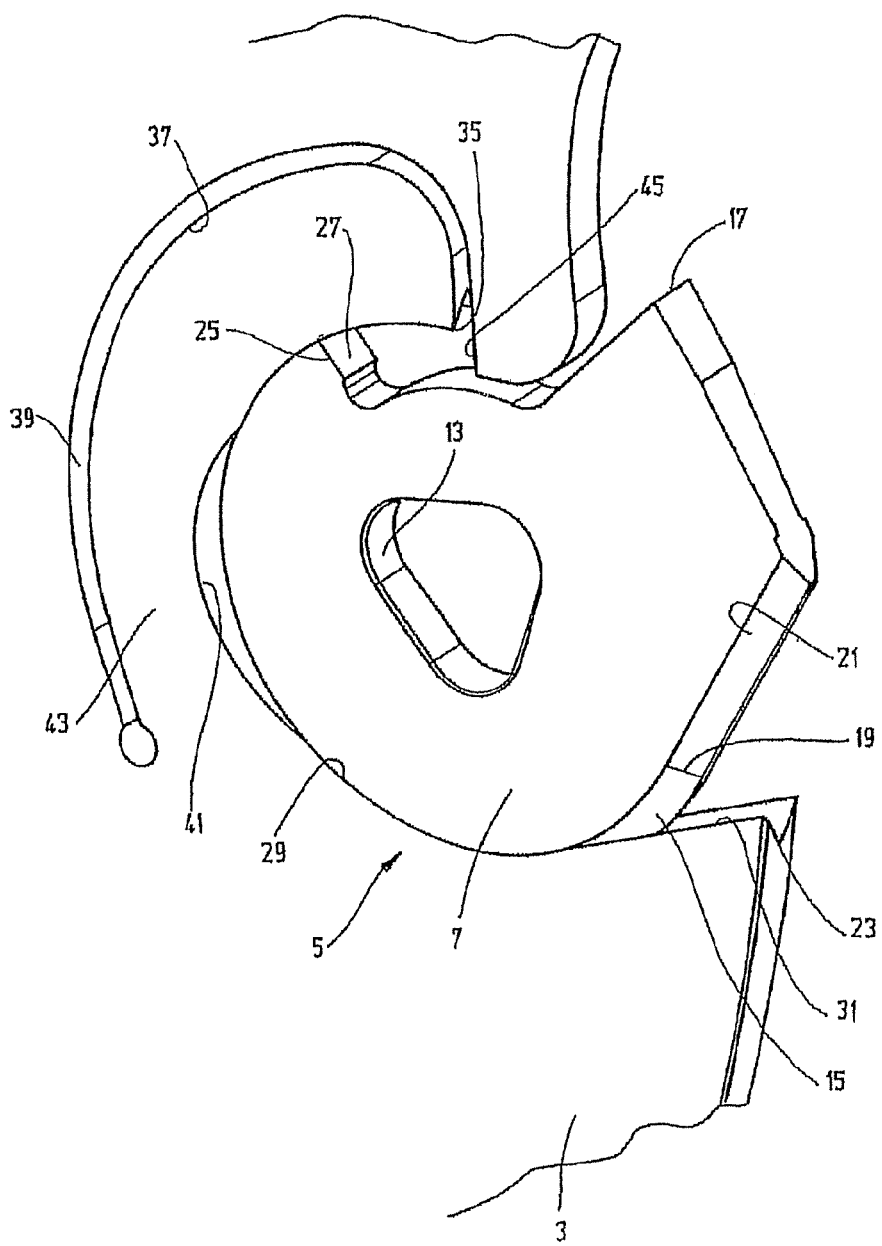
FIG. 3 shows a view corresponding to FIG. 2, a cutting tip being shown in the receptacle in a position assumed before the fixing.
Figure 4:
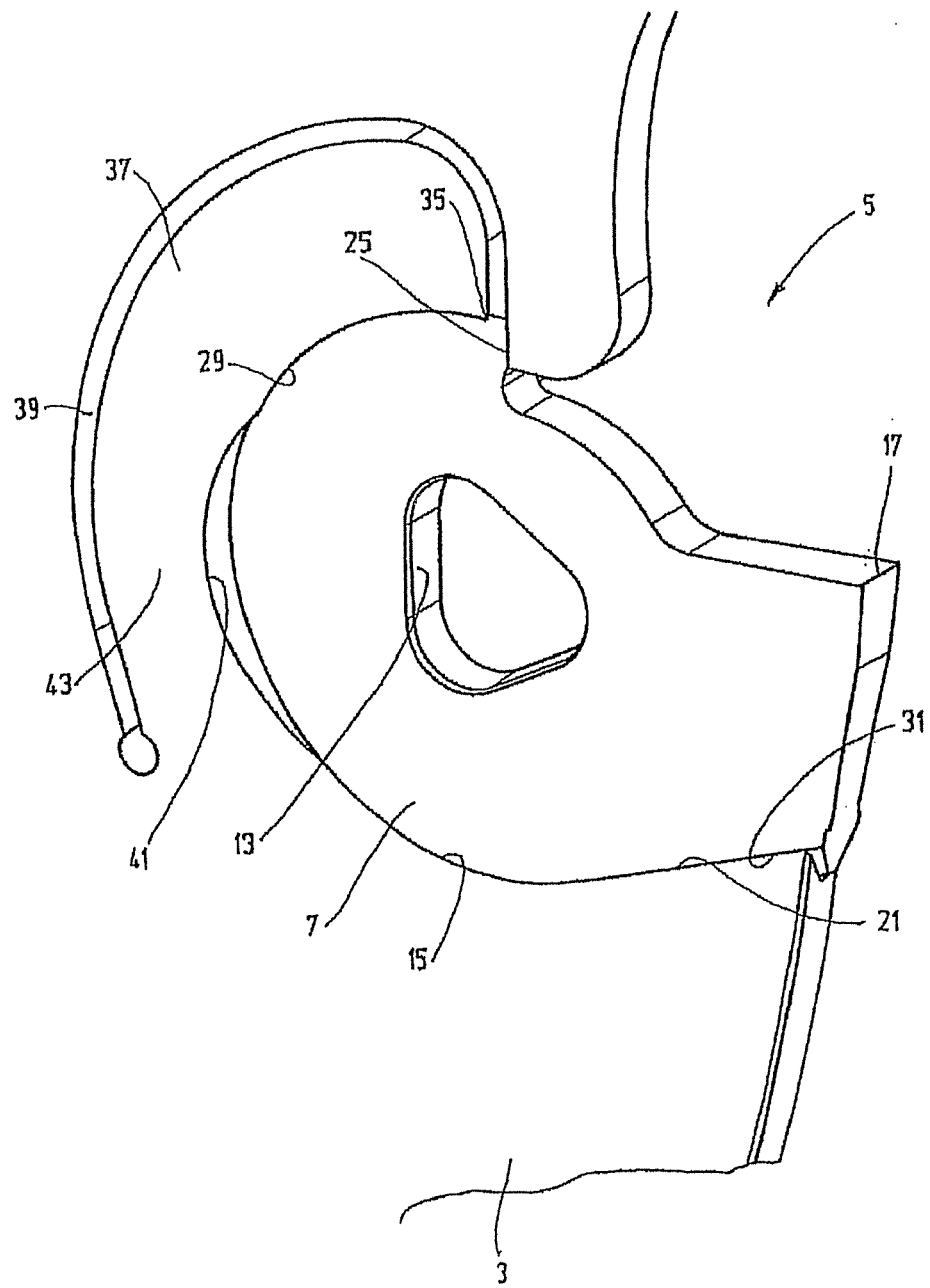
FIG. 4 shows a view corresponding to FIG. 3, the cutting tip being shown in fixed end position.

FIGS. 2 to 4 show further details of the fixing of the cutting tips 7 in the receptacles 5. Provided as a main element for this purpose on the cutting tip 7 is a bearing surface 15 of convex curvature, the start and the end of which are in each case situated at a distance from the cutting edge 17 of the cutting tip 7. As can be seen in particular from FIG. 3, a straight end part 21 adjoins the start 19 of the concave curvature of the bearing surface 15, said end part 21 forming on the cutting tip 7 a counterholding surface, which, in the fixing end position shown in FIG. 4, supports the cutting tip 7 against the cutting forces, acting via the cutting edge 17, on the receptacle 5. As FIGS. 3 and 4 show, the bearing surface 15 and the end part 21 adjoining it are profiled, to be precise by a marginal cross sectional shape like an inverted V. Protection of the cutting tip 7 against lateral forces is obtained in interaction with a corresponding V shape of a recess 23 (FIG. 3) in the receptacle 5. Proceeding from the starting point 19, the convex course of the bearing surface 15 extends in the shape of an arc of a circle up to the end 25 (FIG. 3) situated at a distance from the cutting edge 17, and a surface 27 running inward in a step-like manner adjoins said end 25. This surface 27, in addition to the end part 21, which forms a first counterholding surface, forms a further counterholding surface for supporting relative to the cutting forces acting on the cutting edge 17, as will be described in more detail below.

As an essential component for fixing the cutting tip 7, the receptacle 5 has a concavity-forming supporting surface 29, which, as mentioned, forms a V-shaped recess 23. At the end adjoining the outer periphery of the parent body 3, the supporting surface 29 has an end section 31 which follows a rectilinear course and extends, with a length corresponding to the straight end part 21 of the cutting tip 7, from the outer end up to a starting point 33 (FIG. 2), where the curved course of the supporting surface 29 begins, said curved course extending up to the end 35 of the supporting surface 29. In the present example, this curved course corresponds to a helix having a pitch intensifying the concavity on the receptacle 5. In a practical example for a cutting tip 7 having a bearing surface 15 of a radius in the order of magnitude of 7 mm, a helix having a pitch of −0.27 mm, for example, is suitable, which corresponds to shortening of the radius of about 0.15 mm over an angular range of 200°, measured from the start 33 to the end 35 of the supporting surface 29.

If the cutting tip 7 is rotated clockwise from an initial position corresponding to FIG. 3, the helical course of the supporting surface 29 leads to an increasing clamping force between bearing surface 15 and supporting surface 29. This clamping force acts at the parent body 3 on an elastically flexible clamping part 37. The latter is cut free by a curved slot opening 39 in the parent body 3, the slot opening 39 being directed in such a way that a curved body surrounds most of the helical course of the supporting surface 29. As FIG. 2 shows, the height of the side walls of the V-shaped recess 23 of the supporting surface 29 decreases down to the root of the V-shaped recess 23 in a region 41 situated approximately centrally in the length of the supporting surface 29. This results in a reduction in the material cross section, i.e. a material weakening for promoting the elastic flexibility of the clamping part 37, in the corresponding section 43 of the clamping part 37.

As FIGS. 2 to 4 show, the parent body 3, in front of the end 35 of the supporting surface 29 and thus in front of the corresponding end of the clamping part 37, forms a stop surface 45 projecting toward the interior of the helix. In the fixing end position, shown in FIG. 4, of the cutting tip 7, this stop surface 45 forms a support for the already mentioned surface 27 at the end 25 of the bearing surface 15 of the cutting tip 7. The latter therefore has, in addition to the first counterholding surface formed by the end part 21 of the supporting surface 15, a second counterholding surface, namely the surface 27, which adjoins the end 25 of the bearing surface 15 in a step-like manner. The surface 27 of the cutting tip 7 also serves, in conjunction with the surface 45 of the parent body 3, as a support against centrifugal forces, resulting from rotation for example.

The invention is explained above with reference to the example of a milling tool. It goes without saying the invention can equally be used in non-rotating tools. Whereas the helical course is provided at the concavity, and convexity in the shape of an arc of a circle is used, it goes without saying that a circular course could also be provided on the receptacle and a helical course on the cutting tip, or a helical course could be provided on both the cutting tip and the receptacle, wherein only different pitches would have to be provided.

Therefore, what is claimed, is:

1. A tool system for machining, having:
a cutting insert having a bearing surface at least partly of convex curvature;
at least one receptacle for the cutting insert having a supporting surface at least partly of concave curvature so that the cutting insert can be fixed in the receptacle by rotational movement relative to the receptacle from a start position to an end position;
wherein the convexity and concavity of the bearing surface and the supporting surface, respectively, face one another, and define lines of curvature which are different from one another and of which at least one deviates from the circular form;
wherein the line of curvature of one of the surfaces has a gradually increasing rate of curvature in a direction of the rotational movement, so that during the rotational movement of the cutting insert, a clamping force is produced that increases as the amount of rotation increases up to a maximum upon reaching the end position;
wherein the receptacle comprises a pocket in a parent body in which a slot opening is cut formed, the slot opening defining an elastically flexible clamping part in the parent body, which clamping part surrounds a large part of the line of curvature of the supporting surface and ends in front of the stop surface of the receptacle;
wherein the line of curvature of the bearing surface of the cutting insert corresponds to an arc of a circle, and the line of curvature on the supporting surface of the receptacle has the increasing rate of curvature:
wherein the supporting surface has a V-shaped recess, and the hearing surface of the cutting insert has an inverted V shape; and
wherein a height of side walls defined by the V-shaped recess when proceeding from the first end section to the second end section, decreases from an initial height down to approximately a root of the recess and then increases again up to the initial height.

2. The tool system according to claim 1, wherein the supporting surface, at one end of the receptacle, has a first end section which follows a rectilinear course and is intended for contact with a counterholding, surface which is provided on the cutting, insert for supporting against cutting forces during operation.

3. The tool system according to claim 2, wherein the increasing rate of curvature of the supporting surface starts at the first end section and extends to a second end section of the supporting surface.

4. The tool system according to claim 2, wherein the second end section projects towards an interior of the receptacle and forms a support for a further counterholding surface which is provided on the cutting insert for supporting against cutting forces.

5. The tool system according to claim 1, wherein a region of the reduced height of the side walls of the recess is situated at a distance from both end sections of the supporting surface.

6. The tool system according to claim 1, wherein the parent body comprises a disc rotatable about a tool axis and having a plurality of the receptacles distributed around its periphery, each for one of the cutting inserts.

7. A tool system for machining, comprising:
a supporting body having at least one receptacle formed therein, the receptacle having a supporting surface that has a first end section and a second end section with a concave curvature portion located between, the first end section and the second end section defining a gap between them, the second end section protruding inward from the concave curvature portion;
a cutting insert having a bearing surface that has a first end section and a second end section with a convex curvature portion located between, the second end section protruding outward from the convex curvature portion and abutting the second end section of the supporting surface when the cutting insert is installed within the receptacle;
the curvature portions defining lines of curvature that are different from one another and of which at least one deviates from a circular form;
the supporting body having a slot formed outward of the supporting surface of the receptacle and extending generally parallel with part of the concave curvature portion to cause a clamping force to be exerted on the cutting insert;
one of the curvature portions being a single continuous helix extending from the first end section to the second end section of the surface on which it is located, such that inserting the cutting insert into the receptacle and rotating the cutting insert relative to the supporting body causes the clamping force to continuously increase during rotation of the cutting insert until the second end section of the cutting insert abuts the second end section of the receptacle; and
a V-shaped recess extending along one of the first end sections and curvature portions and a V-shaped profile extending along the other of the first end sections and curvature portions that engages the recess.

8. The tool system according to claim 7, wherein the first end section of the receptacle comprises a straight surface extending from and substantially tangent with the curvature portion of the receptacle.

9. The tool system according to claim 7, wherein:
the curvature portion of the cutting insert comprises a portion of a circle; and
the curvature portion of the receptacle comprises the single continuous helix.

10. The tool system according to claim 7, further comprising a recess extending along one of the first end sections and the curvature portions that is engaged by the other of the first end sections and curvature portions to resist lateral movement of the cutting insert relative to the receptacle once the second end sections abut each other.

11. The tool system according to claim 7, wherein the V-shaped recess defines side walls that reduce in height from the first end section to a central region, and increase in height from the central region to the second end section.

12. The tool system according to claim 7, wherein:
the second end section of the cutting insert extends substantially normal from a junction with the curvature portion of the cutting insert; and
the second end section of the receptacle extends substantially normal from a junction with the curvature portion of the receptacle.

13. The tool system according to claim 7, wherein:
the body comprises a disc with a plurality of the receptacles spaced around a periphery of the disc.

* * * * *